United States Patent [19]

Takada et al.

[11] Patent Number: 5,029,493
[45] Date of Patent: Jul. 9, 1991

[54] HYDRAULIC CONTROL DEVICE IN AUTOMATIC TRANSMISSION IN VEHICLE EQUIPPED WITH ELECTRONIC THROTTLE OPENING CONTROL DEVICE

[75] Inventors: Mitsuru Takada, Toyota; Koujiro Kuramochi, Okazaki; Makoto Funahashi, Toyota, all of Japan

[73] Assignee: Toyota Jidosha Kabushiki Kaisha, Aichi, Japan

[21] Appl. No.: 559,053

[22] Filed: Jul. 30, 1990

[30] Foreign Application Priority Data

Aug. 30, 1989 [JP] Japan .................... 1-223489

[51] Int. Cl.⁵ .............................. B60K 41/06
[52] U.S. Cl. ........................ 74/857; 74/866
[58] Field of Search ............ 74/856, 857, 858, 861, 74/866; 364/424.1; 192/0.077, 0.075; 123/397, 399

[56] References Cited

U.S. PATENT DOCUMENTS

| 4,072,220 | 2/1978 | Hamada ................... 192/0.075 |
| 4,194,608 | 3/1980 | Usui et al. ............... 192/0.075 |
| 4,342,298 | 8/1982 | Ganoung ................... 74/857 X |
| 4,703,304 | 10/1987 | Muguruma et al. ...... 364/424.1 X |

FOREIGN PATENT DOCUMENTS

| 31669 | 3/1980 | Japan ....................... 74/857 |
| 97945 | 6/1982 | Japan ....................... 74/857 |
| 57-107045 | 7/1982 | Japan . |
| 59-122742 | 7/1984 | Japan . |
| 62-201135 | 12/1987 | Japan . |

Primary Examiner—Dwight Diehl
Attorney, Agent, or Firm—Oliff & Berridge

[57] ABSTRACT

In a vehicle in which opening of an intake throttle valve is controlled in accordance with stepping-on amount of an accelerator pedal by way of an electronic throttle opening control device, a hydraulic pressure control device is provided so as to detect a discrepancy between the stepping-on amount of the accelerator pedal and the opening of the intake throttle valve and to automatically cancel supply of hydraulic pressure to a selected one of friction engaging devices of an automatic transmission of the vehicle when the discrepancy exceeds a certain allowable limit value.

4 Claims, 5 Drawing Sheets

| RANGE | SPEED STAGE | FIRST SOLENOID (400) | SECOND SOLENOID (410) | THIRD SOLENOID (420) | C1 (38) | C2 (40) | C3 (42) | C4 (44) | B1 (46) | B2 (48) | F1 (34) | F2 (36) | REMARKS |
|---|---|---|---|---|---|---|---|---|---|---|---|---|---|
| R | ALLOWED | | | | | | ○ | | | ○ | | | |
|   | INHIBITED | | | ○ | | | | | | | | | ABOVE A PREDETERMINED SPEED |
| D | 1st | ○ | ○ | | ○ | | | | | | | ○ | |
|   | 2nd | ○ | | ○ | ○ | ○ | | | | | ○ | ○ | |
|   | 3rd | | | ○ | ○ | ○ | | ○ | | | ○ | | |
|   | 4th | | ○ | | ○ | | | ○ | ○ | | | | |
| S | 1st | ○ | ○ | | ○ | | | | | | | ○ | |
|   | 2nd | ○ | | | ○ | ○ | | | | | ○ | ○ | |
|   | 3rd | | ○ | | ○ | ○ | | ○ | | | | | |
|   | (3rd) | | | | ○ | | | ○ | ○ | | ○ | ○ | WHEN SOLENOID VALVE FAILED |
| L | 1st | ○ | | | ○ | | | | ○ | | ○ | ○ | |
|   | 2nd | ○ | | | ○ | ○ | | | ○ | | ○ | ○ | |
|   | (2nd) | | ○ | | ○ | ○ | | ○ | ○ | | ○ | ○ | WHEN SOLENOID VALVE FAILED |

|  | C0 | C1 | C2 | B0 | B1 | B2 | B3 | F0 | F1 | F2 |
|---|---|---|---|---|---|---|---|---|---|---|
| 1st | ○ | ○ |  |  |  |  | (○) | ○ |  | ○ |
| 2nd | ○ | ○ |  |  | (○) | ○ |  | ○ | ○ |  |
| 3rd | ○ | ○ | ○ |  |  | ○ |  | ○ |  |  |
| 4th |  | ○ | ○ | ○ |  | ○ |  |  |  |  |
| Rev | ○ |  | ○ |  |  |  | ○ |  |  |  |

HYDRAULIC CONTROL DEVICE IN AUTOMATIC TRANSMISSION IN VEHICLE EQUIPPED WITH ELECTRONIC THROTTLE OPENING CONTROL DEVICE

BACKGROUND OF THE INVENTION

1. Field of the Invention

The present invention relates to a control device for an automatic transmission for a vehicle such as a automobile, and more particularly to a control device for an automatic transmission in a vehicle in which the intake throttle valve is opened in accordance with the stepping-on of the accelerator pedal by way of an electronic throttle opening control device.

2. Description of the Prior Art

In accordance with the recent developments of the so-called computer control of automobiles it has been thought of and actually practiced to control the opening of the intake throttle valve of the engine in accordance with the stepping-on of the accelerator pedal by way of an electronic throttle opening control device instead of the conventional mechanical linkage. By using such an electronic throttle opening control device it is possible to obtain such an advantage that the opening of the intake throttle valve is not simply controlled in accordance with the amount of stepping-on of the accelerator pedal but is controlled in accordance with certain modification of the driver's request for engine output power expressed in the stepping-on amount of the accelerator pedal by various other control parameters with respect to certain operational conditions of the vehicle.

In order to ensure a driving power of the engine enough to guarantee certain drivability of the vehicle in the case where a failure has occurred in an electric part such as motor, electric circuit, sensor or the like in such an electronic throttle opening control device, it has been proposed in Japanese Patent Laying-open Publication 59-122742 to additionally incorporate such a mechanical control device between the accelerator pedal and the throttle valve that guarantees a minimum opening of the throttle valve when the accelerator pedal is stepped on.

However, it would also happen that the throttle opening increases so much that the driving power of the engine increases due to a failure or the like of an electric part in such an electronic throttle opening control device.

SUMMARY OF THE INVENTION

In view of the above-mentioned probability, it is the object of the present invention to improve an electronic throttle opening control device for controlling opening of the intake throttle valve of the engine in accordance with the stepping-on of the accelerator pedal so that an excessive opening of the throttle valve due to a failure in the electronic throttle opening control device is definitely avoided.

According to the present invention, the above-mentioned object is accomplished by a hydraulic pressure control device in an automatic transmission in a vehicle in which opening of an intake throttle valve is controlled in accordance with stepping-on amount of an accelerator pedal by way of an electronic throttle opening control means, comprising a first means for detecting a discrepancy between the stepping-on amount of the accelerator pedal and the opening of the intake throttle valve, and a second means for automatically cancelling supply of hydraulic pressure to a selected one of friction engaging means in said automatic transmission when said first means detects that said discrepancy exceeds a certain allowable limit value.

By the discrepancy between the stepping-on amount of the accelerator pedal and the opening of the intake throttle valve being detected and the supply of hydraulic pressure to certain friction engaging means in the automatic transmission being cancelled when said discrepancy exceeds an allowable limit value, the rotational power transmission in the vehicle can be definitely dissolved regardless whether the transmission has a conventional construction or incorporates certain modern construction so that any driving inconvenience due to excessive opening of the intake throttle valve is positively avoided.

When said vehicle comprises a sensor for detecting actual opening of the intake throttle valve, and an electronic fuel injection control means for controlling fuel injection according to input control parameters including the opening of the intake throttle valve, said electronic fuel injection control means may conveniently be constructed to generate an electric signal representing the opening of the intake throttle valve based upon a signal received from said sensor, while said electronic throttle opening control means generates an electric signal representing the stepping-on amount of the accelerator pedal, so that said first means may conveniently include a comparator circuit for comparing said electric signal representing the opening of the intake throttle valve with said electric signal representing the stepping-on amount of the accelerator pedal.

Further, said second means may comprise a solenoid valve means for selectively opening a drain port means, and a spool valve means having a spool, a first and a second port means adapted to be communicated with one another or isolated from one another according to a first or a second shift position of said spool, a control port means open to a first end portion of said spool for receiving a hydraulic pressure to bias said spool from said first shift position to said second shift position, and a spring means for biasing said spool from said second shift position to said first shift position, a hydraulic passage means for connecting said control port means with said first port means, and an orifice means for throttling an intermediate portion of said passage means, said drain port means being adapted to drain said passage means at a portion located between said control port means and said orifice means, said supply of hydraulic pressure to said selected one of friction engaging means being conducted through said first and second port means in said order.

In the above construction, when said automatic transmission comprises a pump means for generating a source hydraulic pressure for said supply of hydraulic pressure, said source hydraulic pressure may be conducted through said first and second port means.

BRIEF DESCRIPTION OF THE DRAWINGS

In the accompanying drawings.

DESCRIPTION OF THE PREFERRED EMBODIMENT

In the following the present invention will be described in more detail with respect to a preferred embodiment thereof with reference to the accompanying drawings.

Figure 1:
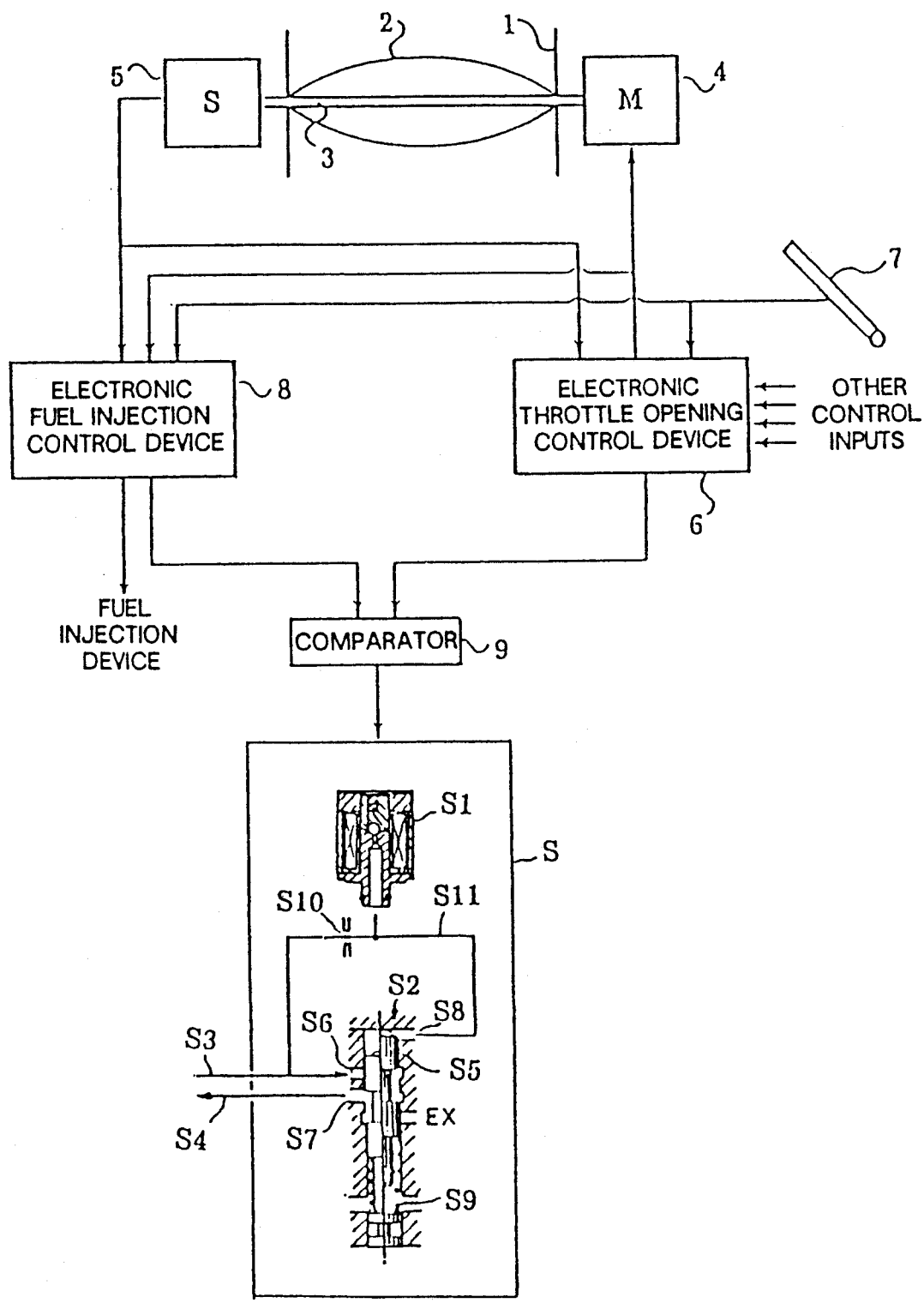
FIG. 1 is a diagrammatic illustration of an embodiment of a device according to the present invention for selectively disconnecting a hydraulic passage based upon the detection of certain discrepancy between the stepping-on amount of the accelerator pedal and the opening of the intake throttle valve.

Referring to FIG. 1, 1 designates a part of an intake passage of an engine incorporating therein a butterfly type intake throttle valve 2 rotatably supported by a shaft 3. The shaft 3 is adapted to be rotated by a motor 4, while the rotational angle of the shaft 3 is detected by a sensor 5. The motor 4 is supplied with an electric current controlled by an electronic throttle opening control device 6 so as to rotate the intake throttle valve 2 to a certain rotational position in accordance with the electric current supplied thereto. The electronic throttle opening control device 6 is supplied with a signal with respect to the stepping-on amount of an accelerator pedal 7, modifies said signal in accordance with engine temperature, atmospheric temperature, on-off switching condition of an air-conditioner, speed stages set up in an automatic transmission and/or other optional control inputs, and outputs said electric current for actuating the motor 4 so as to control the opening of the intake throttle valve 2 according to the feedback control manner with reference to the actual opening of the intake throttle valve 2 detected by the sensor 5.

In the shown embodiment the electronic throttle opening control device 6 is combined with an electronic fuel injection control device 8 which calculates the amount of fuel injection based upon the signal with regard to the stepping-on amount of the accelerator pedal supplied from the accelerator pedal 7, an electric signal according to the current supplied from the electronic throttle opening control device 6 to the motor 4 and the signal with respect to the throttle opening supplied from the sensor 5 so as to generate an electric output for actuating a fuel injection device not shown in the figure.

The stepping-on amount of the accelerator pedal 7 is electronically processed in the electronic throttle opening control device 6 which generates an electric output corresponding to the stepping-on amount of the accelerator pedal, said electric output being supplied to a comparator circuit 9. On the other hand the opening of the intake throttle valve 2 detected by the sensor 5 is electronically processed in the electronic fuel injection control device 8 which generates an electric output corresponding to the opening of the intake throttle valve 7, said electric output being also supplied to the comparator circuit 9. The comparator circuit 9 compares these two electric signals supplied thereto and dispatches an output signal to a hydraulic pressure shutdown device S described in more detail hereinunder when a discrepancy beyond a certain allowable limit occurs between the two electric signals supplied thereto.

Thus, by the information with regard to the stepping-on amount of the accelerator pedal 7 being electronically processed in the electronic throttle opening control device 7 while the information with regard to the opening of the intake throttle valve 2 detected by the sensor 5 is electronically processed by utilizing the electronic fuel injection control device 8 independent from the electronic throttle opening control device 6 any discrepancy which may occur between the stepping-on amount of the accelerator pedal 7 and the actual opening of the intake throttle valve 2 due to a failure in the electronic throttle opening control valve 6 is detected at higher reliability.

The hydraulic pressure shutdown device S comprises a normally open type solenoid valve S1 and a hydraulic passage shutdown valve S2 and is so adapted that when the solenoid valve S1 is not energized it communicates a hydraulic passage S3 with a hydraulic passage S4, whereas when the solenoid valve S1 is energized it intercepts the communication between the passages S3 and S4. In more detail, the hydraulic passage shutdown valve S2 comprises a spool S5, several ports such as ports S6 and S7 the communication between which is controlled in accordance with up and down movement of the spool S5 in the figure and a control port S8, and a compression coil spring S9 biasing the spool S5 upward in the figure, and is so adapted that when no control pressure is supplied to the control port S8 the spool S5 is in its raised position as shown in the right half portion in the figure so as to communicate the port S6 with the port S7 so that passage S3 communicates with the passage S4, whereas when a control pressure is supplied to the control port S8 the spool S5 is positioned at its lowered position as shown in the left half portion in the figure so as to interrupt the communication between the ports S6 and S7 so that the passage S3 is disconnected from the passage S4. The control port S8 is connected with the passage S3 by a passage S11 throttled at a portion thereof by an orifice S10, and the passage S11 is adapted to be selectively drained at a downstream side of the orifice S10 as viewed along a flow of hydraulic fluid from the passage S3 to the control port S8 by the solenoid valve S1.

Thus, the hydraulic pressure shutdown device S communicates the passage S3 with the passage S4 when the solenoid valve S1 is not energized, while it shuts down the communication between the passages S3 and S4 when the solenoid valve S1 is energized.

Figures 2, 3:
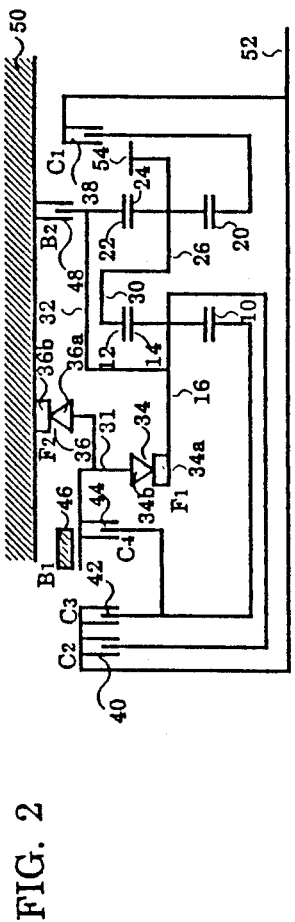
FIG. 2 is a diagrammatic illustration of an example of a planetary gear type transmission mechanism of an automatic transmission for a vehicle to which the control device according to the present invention may be applied.
FIG. 3 shows a table giving combinations of selective energization of the solenoid valves and the corresponding engagement of clutches, brakes and one way clutches for setting up various speed stages in the automatic transmission shown in FIG. 2.

Referring next to FIG. 2, there is shown a speed stage shifting mechanism of an automatic transmission for a vehicle such as an automobile to which the present invention may be applied. This speed stage shifting mechanism comprises a first planetary gear mechanism having a first sun gear 10, a first ring gear 12 coaxial with the first sun gear 10, a first planetary pinion 14 meshing with the first sun gear 10 and the first ring gear 12, and a first carrier 16 rotatably supporting the first planetary pinion 14, and a second planetary gear mechanism having a second sun gear 20, a second ring gear 22 coaxial with the second sun gear 20, a second planetary pinion 24 meshing with the second sun gear 20 and the second ring gear 22, and a second carrier 26 rotatably supporting the second planetary pinion 24. The first ring gear 12 is connected with the second carrier 26 by a connecting member 30. The first carrier 16 is connected with the second ring gear 22 by a connecting member 32.

A first one way clutch (F$_1$) 34 and a second one way clutch (F$_2$) 36 are provided in series between a housing 50 and the first carrier 16 which is also connected with the second ring gear 22 by the connecting member 32. The first one way clutch 34 is closer to the first carrier 16 and the second one way clutch 36 is closer to the housing 50. In more detail, the first one way clutch 34 has an inner race 34a connected with the first carrier 16 and an outer race 34b connected via a connecting member 31 with an inner race 36a of the second one way clutch which also has an outer race 36b connected with the housing 50. The first one way clutch 34 is engaged when the outer race 34b would rotate relative to the inner race 34a in a first rotational direction and slips when the inner race 34a rotates relative to the outer race 34b in a second rotational direction opposite to said first rotational direction. Similarly, the second one way clutch 36 is engaged when the inner race 36a would rotate relative to the outer race 36b in said first rotational direction and slips when the inner race 36a rotates relative to the outer race 36a in said second rotational direction.

The second carrier 26 is connected with an annular gear member 54 which operates as an output rotational member of this speed stage shifting mechanism.

A first clutch (C$_1$) 38 is provided between the second sun gear 20 and an input shaft 52 for selectively connecting these two members with one another. A second clutch (C$_2$) 40 is provided between the first carrier 16 and the input shaft 52 for selectively connecting these two members with one another. A third clutch (C$_3$) 42 is provided between the first sun gear 10 and the input shaft 52 for selectively connecting these two members with one another. A fourth clutch (C$_4$) 44 is provided between the first sun gear 10 and the connecting member 31 for selectively connecting the sun gear 10 with the outer race 34b of the one way clutch 34 and the inner race 36b of the one way clutch 36.

A first brake (B$_1$) 46 is provided between the connecting member 31 and the housing 50 for selectively fixing the connecting member 31 relative to the housing 50. A second brake (B$_2$) 48 is provided between the combination of the second ring gear 22 and the first carrier 16 and the housing 50 for selectively fixing the second ring gear 22 and the first carrier 16 with respect to the housing 50.

The manner of providing a first speed stage, a second speed stage, a third speed stage (direct connection stage), a fourth speed stage (overdrive stage) and a reverse stage is shown in Table 1 and FIG. 3. In Table 1 and FIG. 3 a circle (O) indicates that the corresponding clutch, brake or one way clutch is engaged in engine drive state, and in Table 1 a circle in parentheses ((O)) indicates that the corresponding clutch or brake is engaged to provide the corresponding speed stage with the effect of engine braking.

When the ratio of the number of gear teeth of the first ring gear 12 to that of the first sun gear 10 is r$_1$, and the ratio of the number of gear teeth of the second ring gear 22 to that of the second sun gear 20 is r$_2$, speed change gear ratios at the respective speed stages are as shown in Table 2.

Figure 4:
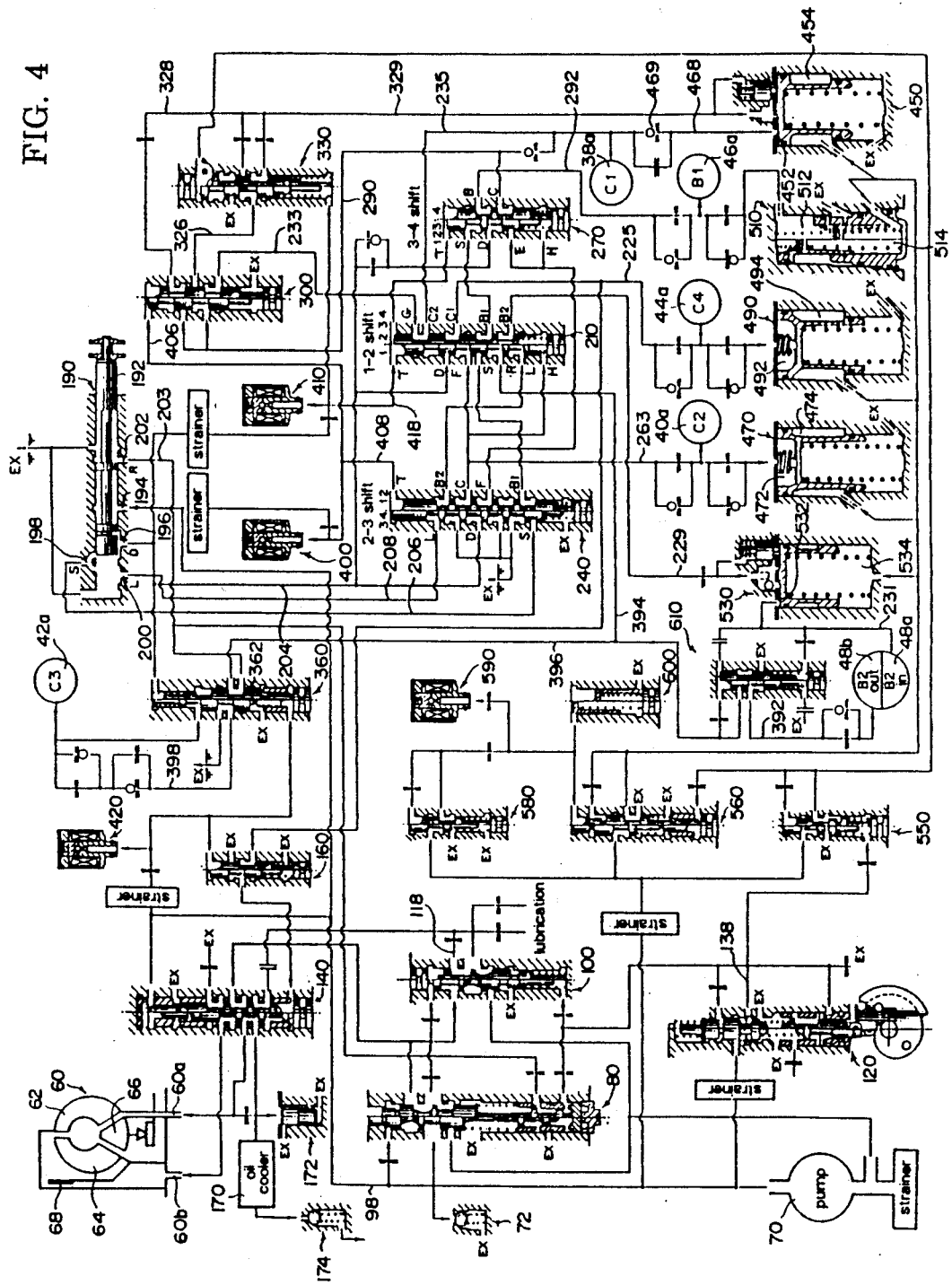
FIG. 4 is a diagram showing an example of a hydraulic pressure control circuit for operating the automatic transmission shown in FIG. 2.

The first clutch 38, the second clutch 40, the third clutch 42, the fourth clutch 44, the first brake 46 and the second brake 48 are all of a hydraulically operating type having, as shown in FIG. 4, hydraulic pressure chambers 38a, 40a, 42a, 44a, 46a and 48a plus 48b, respectively, and are adapted to be engaged when a hydraulic pressure is supplied to the hydraulic pressure chambers and are disengaged when the hydraulic pressure has been exhausted from the hydraulic pressure chambers. The supply and the exhaust of the hydraulic pressure to and from these hydraulic pressure chambers are carried out by a hydraulic pressure control circuit such as shown in FIG. 4.

The input shaft 52 of the above-mentioned planetary gear type speed change device is drivingly connected with a motor such as an internal combustion engine not shown in the figure via a fluid torque converter 60 such as shown in FIG. 4.

The fluid torque converter 60 is of a three elements two phases type comprising a pump impeller 62 drivingly connected with an output member of the motor, a turbine rotor 64 drivingly connected with the input shaft 52 of the planetary gear type speed stage shifting mechanism, and a stator 66 rotatable only in one direction. The fluid torque converter 60 further comprises a lock-up clutch 68 which is engaged to connect the pump impeller 62 directly with the turbine rotor 64 when a hydraulic pressure is supplied to its port 60a and is disengaged when a hydraulic pressure is supplied to its port 60b. The supply of hydraulic pressure to the ports 60a and 60b is carried out by the hydraulic control device shown in FIG. 4.

The outline of the hydraulic control device shown in FIG. 4 will now be described.

The hydraulic control device comprises a pump 70 which takes in an operating hydraulic fluid such as an oil from a reservoir not shown in the figure and supplies the hydraulic fluid to a primary regulator valve 80 generally called a line pressure control valve and also to a throttle valve 120. The maximum value of the hydraulic pressure supplied by the pump 70 to the primary regulator valve 80 is restricted by a pressure relief valve 72.

The throttle valve 120 provides in a passage 138 a hydraulic pressure which varies in accordance with the load on the engine and is generally called a throttle pressure.

The primary regulator valve 80 is supplied with the throttle pressure and a reverse boost pressure and provides in a passage 98 the line pressure which generally increases along with increase of the throttle opening and a hydraulic pressure for a secondary regulator valve 100 generally called a converter pressure control valve.

The secondary regulator valve 100 is supplied with the throttle pressure and provides a converter pressure (lubricating hydraulic pressure) in a passage 118. The line pressure in the passage 98 is supplied to a port 194 of a manual valve 190. The manual valve 190 has a spool 192 adapted to be operated by a hand of a driver and selectively provides the line pressure supplied to the port 194 at a D port 196 in the so-called D range, also at an S port 198 in the so-called S or 2 range, further at an L port 200 in the so-called L range, and at an R port 202 in the so-called R range.

The line pressure supplied to the D port 196 is conducted through a passage 204 to a D port of a 1-2 shift valve 210, a D port of a 2-3 shift valve 240, and a D port of a 3-4 shift valve 270. The line pressure supplied to the S port 198 is conducted through a passage 206 to an S port of the 2-3 shift valve 240. The line pressure supplied to the L port 200 is conducted through a passage 208 to an L port of the 2-3 shift valve 240. The line pressure supplied to the R port 202 is conducted through a passage 203 to a reverse inhibit valve 360.

The 2-3 shift valve 240 comprises a spool element and a plug element, and in addition to the above-mentioned ports further comprises drain ports, a clutch port C, brake ports B1 and B2 and a fail safe port F. When a hydraulic pressure is supplied to a control port T, the plug element and the spool element are shifted downward in the figure to a "1,2" shift position as shown in the right half portion thereof by overcoming the spring force of a compression coil spring so as to connect the clutch port C with the drain port, the brake port B1 with the S port, the brake port B2 with the L port, and the fail safe port F with the D port, respectively. In contrast, when no hydraulic pressure is supplied to the control port T, the plug element and the spool element are shifted upward in the figure to a "3,4" shift position as shown in the left half portion thereof by the spring force of the compressing coil spring so as to connect the clutch port C with the D port, and the brake ports B1 and B2 and the fail safe port F with the drain ports. The supply of the hydraulic pressure to the control port T is controlled by a first solenoid valve 400.

The clutch port C of the 2-3 shift valve 240 is connected through a passage 263 with the hydraulic pressure chamber 40a of the second clutch 40 and an accumulator chamber 472 of an accumulator 470 for the clutch $C_2$. The clutch port C of the 2-3 shift valve 240 is also connected through a passage with a hold port H of the 1-2 shift valve 210, and also through a passage with a fail safe port F of the 1-2 shift valve 210. The fail safe port F also has a concept of drain port because it is connectable to drain through the drain ports of the 2-3 shift valve. The brake port B1 of the 2-3 shift valve 240 is connected through a passage with an S port of the 1-2 shift valve 210. The brake port B2 of the 2-3 shift valve 240 is connected through a passage with an L port of the 1-2 shift valve 210. The fail safe port F of the 2-3 shift valve 240 is connected through a passage with a hold port H of the 3-4 shift valve 270 and also connected through a passage with a drain port E of the 3-4 shift valve 270.

The 1-2 shift valve 210 comprises a spool element, and in addition to the above-mentioned ports further comprises a clutch ports C1 and C2, brake ports B1 and B2, and R port, a G port and a control port T. When a hydraulic pressure is supplied to the control port T the spool element is shifted downward in the figure as shown in the left half portion thereof to a "1" shift position by overcoming the spring force of a compression coil spring so as to connect the clutch port C1 with the fail safe port F, the brake port B1 with the R port, and the brake port B2 with the L port, while isolating the G port from the clutch port C2. In contrast, when no hydraulic pressure is supplied to the control port T, the spool element is shifted upward in the figure as shown in the right half portion thereof to a "2,3,4" shift position by the spring force of the compression coil spring so as to connect the clutch port C1 with the D port, the brake port B1 with the S port, the brake port B2 with the R port, and the G port with the clutch port C2.

The supply of the hydraulic pressure to the control port T of the 1-2 shift valve 210 is controlled by a second solenoid valve 410. The control port T of the 1-2 shift valve 210 is connected through a passage with a control port T of the 3-4 shift valve 270.

The clutch port C1 of the 1-2 shift valve 210 is connected through a passage 225 with the hydraulic pressure chamber 44a of the fourth clutch 44 and an accumulator chamber 492 of an accumulator 490 for the clutch $C_4$. The brake port B1 of the 1-2 shift valve 210 is connected through a passage with an S port of the 3-4 shift valve 270. The brake port B2 of the 1-2 shift valve 210 is connected through a passage 229 with an accumulator chamber 532 of an accumulator 530 for the brake $B_2$, and is further connected through a passage 231 with the inside hydraulic pressure chamber 48a of the second brake 48. The G port of the 1-2 shift valve 210 is connected through a passage 233 with a port of a $C_1$ control valve 300. The clutch port C2 of the 1-2 shift valve 210 is connected through a passage 235 with the hydraulic chamber 38a of the first clutch 38.

The 3-4 shift valve 270 comprises a spool element, and in addition to the above-mentioned ports further comprises a clutch port C, a brake port B and a control port T. When no hydraulic pressure is supplied to the hold port H while a hydraulic pressure is supplied to the control port T, the spool element is shifted downward in the figure to a "4" shift position as shown in the right half portion thereof by overcoming the spring force of a compression coil spring so as to connect the clutch port C with the drain port E, and the brake port B with the D port. In contrast, when a hydraulic pressure is supplied to the hold port H, or when no control pressure is supplied to the control port T, the spool element is shifted upward in the figure to a "1,2,3" shift position as shown in the left half portion thereof by the hydraulic pressure supplied to the hold port H and/or the spring force of the compression coil spring so as to connect the clutch port C with the D port, and the brake port B with the S port.

The clutch port C of the 3-4 shift valve 270 is connected through a passage 290 with the $C_1$ control valve 300. The brake port B of the 3-4 shift valve 270 is connected through a passage 292 with the hydraulic pressure chamber 46a of the first brake 46 and an accumulator chamber 512 of an accumulator 510 for the brake $B_1$.

The first solenoid valve 400 and the second solenoid valve 410 are normally open type valves which open their ports when not energized and close their ports when energized. The manner of energization of these solenoid valves is shown in FIG. 3 in relation with the speed stages to be set up. In FIG. 3 a circle (O) indicates energization of the corresponding solenoid valve.

The first solenoid valve 400 is connected through a passage 408 with the control port T of the 2-3 shift valve 240 and is also connected through a passage 406 with a port of the C1 control valve 300.

The second solenoid valve 410 is connected through a passage 418 with the control port T of the 1-2 shift valve 210, and is also connected through a passage with the control port T of the 3-4 shift valve 270.

Therefore, when the solenoid valve 400 is energized the control port T of the 2-3 shift valve 240 is supplied with a hydraulic pressure, and when the solenoid valve 410 is energized the control port of the 1-2 shift valve 210 and also the control port T of the 3-4 shift valve 270 are supplied with a hydraulic pressure.

The $C_1$ control valve 300 controls switching over of the connection of the passage 290 with passages 233, 326 and 328 according to the speed stages which require engagement of the first clutch 38.

The passage 328 is connected through a passage 329, an accumulator chamber 452 of an accumulator 450 for the clutch $C_1$, a passage 468 and a one way valve 469 with the hydraulic pressure chamber 38a of the first clutch 38. The passage 326 is connected with a port of a 4-3 control valve 330.

The 4-3 control valve 330 controls the timing of the engagement of the first clutch 38 in speed stage shifting between the third speed stage and the fourth speed stage by connecting the passage 326 with either of the two passages incorporating different throttling ratios so as to switch over the rate of supply of hydraulic pressure to the hydraulic pressure chamber 38a. The two passages are both connected with a passage 329 which is connected through the accumulator chamber 452, the passage 468 and the one way valve 469 with the hydraulic pressure chamber 38a of the first clutch 38.

The reverse inhibit valve 360 is supplied with the line pressure from the R port 202 of the manual valve 190 through a passage 203, and is switched over according to opening or closing of the third solenoid valve 420 so as to be at an inhibit position where a spool 362 is shifted up as shown in a left half portion thereof when the vehicle is running forward at a speed greater than a predetermined value and to be in a non inhibit position where the spool element 362 is shifted down as shown in the right half portion thereof during other operating conditions while allowing the line pressure from the passage 203 to flow to the passage 398 toward the hydraulic pressure chamber 42a of the third clutch 42, to the passages 396 and 394 toward the R port of the 1-2 shift valve 210, and also to the passage 396, a $B_2$ sequence valve 610 and a passage 392 toward the outside hydraulic pressure chamber 48b of the second brake 48.

The $B_2$ sequence valve 610 operates in response to the hydraulic pressure in the inside hydraulic pressure chamber 48a of the second brake 48 so as to connect the passage 396 with the passage 392 so that the outside hydraulic pressure chamber 48b is supplied with the hydraulic pressure when the hydraulic pressure in the inside hydraulic pressure chamber 48a is greater than a predetermined value.

Accumulators 450, 470, 490, 510 and 530 are back pressure control type accumulators having back pressure chambers 454, 474, 494, 514 and 534, respectively. The hydraulic pressure supplied to these back pressure chambers is controlled by a second accumulator control valve 560. The second accumulator control valve 560 is supplied with a duty hydraulic pressure controlled by a duty solenoid valve 590 and the hydraulic pressure from the first accumulator control valve 550 to change its output control pressure. The duty solenoid valve 590 is supplied with a pulse signal having a determinate duty ratio and cyclically opens and closes according to the duty ratio so as to control a modulate hydraulic pressure from a duty control valve 580 according to the duty ratio. The duty hydraulic pressure controlled by the duty solenoid valve 590 for the second accumulator control valve 560 is rectified of its pulses by a duty pressure accumulator 600. The first accumulator control valve 550 is supplied with the throttle pressure from the throttle valve 138 so as to control the hydraulic pressure supplied to the second accumulator control valve 560 and the 4-3 control valve 330 in accordance with the throttle pressure.

The supply of the converter pressure to the ports 60a and 60b of the fluid torque converter 60 is controlled by a lock up relay valve 140. The lock up relay valve 140 is switched over according to a selective supply of a hydraulic pressure from a lock up signal valve 160. The lock up relay valve 140 supplies hydraulic fluid, i.e., oil, toward an oil cooler 170. The hydraulic pressure in the passage including the oil cooler 170 is limited by a cooler by-pass valve 172 and a relief valve 174. The lock up signal valve 160 is supplied with a hydraulic pressure from the clutch port C1 of the 1-2 shift valve 210 and is switched over in accordance with on and off of the third solenoid valve 420 so as to supply the hydraulic pressure supplied from the clutch port C1 of the 1-2 shift valve 210 to the lock up relay valve 140 and to engage the lock up clutch 68 when the third solenoid valve 420 is energized. The third solenoid valve 420 is selectively energized as shown in FIG. 3 for inhibiting engagement of the lock up clutch 68 in the reverse stage where the manual shift valve is shifted to the R range and when the manual shift valve is sifted to the D range.

By the hydraulic pressure control device having the above-mentioned construction, in accordance with shift positions of the manual valve and selective energization of the first, second and third solenoid valves as shown in the chart of FIG. 3, the clutches $C_1$, $C_2$, $C_3$ and $C_4$ and the brakes $B_1$ and $B_2$ are selectively engaged, so that various speed stages are set up corresponding to the respective shift positions of the manual valve.

Therefore, a clutch or a brake which is to be disengaged in order to dissolve the rotational power transmission through the automatic transmission shown in FIG. 2 will be appropriately selected in view of the table shown in FIG. 3. If all of the rotational power transmission through the automatic transmission is to be resolved when the comparator circuit 9 detects that a discrepancy beyond a certain allowable limit has occurred between the stepping-on amount of the accelerator pedal and the opening of the intake throttle valve, the clutches or the brakes which are to be automatically disengaged are clutch $C_1$, at least one of the groups consisting of clutches $C_2$ and $C_4$ and brake $B_1$, and at least one of the group consisting of clutch $C_3$ and brake $B_2$, i.e. at least three friction engaging means such as clutches and brakes.

It would be possible in various manners to interrupt supply of the hydraulic pressure to the above-mentioned at least three friction engaging means by incorporating the hydraulic pressure shut up device S shown in FIG. 4 if a plurality of hydraulic pressure shut up device S or at least a plurality of hydraulic passage shut up valve S2 may be employed. However, since the supply of hydraulic pressure to the clutch $C_3$ and the brake $B_2$ is taken out from the R port 202 of the manual valve 190 which is isolated from the D port 196, the S port 198 and the L port 200 for taking out the hydraulic pressure supplied to the other clutches and brakes, if the supply of hydraulic pressure to the above-mentioned at least three friction engaging means is cancelled by use of a single unit of the hydraulic pressure shut up device S, it is convenient that the hydraulic pressure shut up device S is provided in a hydraulic pressure source supply passage extending from the pump 70 to the inlet port 194 of the manual valve 190.

Figure 5:
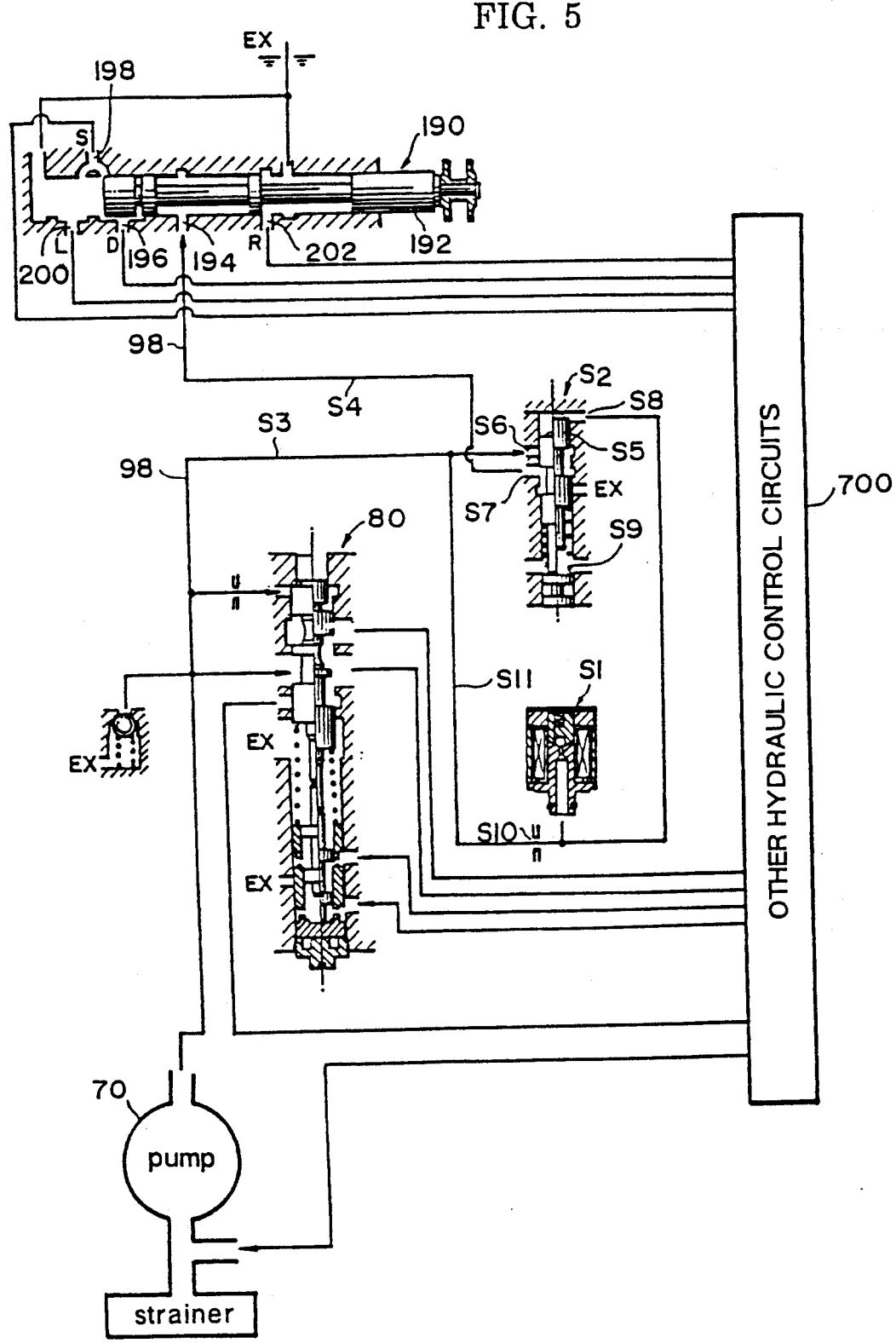
FIG. 5 is a diagram showing an embodiment of the hydraulic control device according to the present invention incorporated in the hydraulic pressure control circuit shown in FIG. 4.

FIG. 5 shows such an embodiment that the hydraulic pressure shut up device S is incorporated in the passage 98 which conducts the line pressure controlled by the primary regulator valve 80 to the input port 194 of the manual valve 190. In FIG. 5 the portions corresponding to those shown in FIGS. 1 and 4 are partly shown with the same reference numerals as in those figures and partly incorporated into a simplified indication such as other hydraulic control circuits 700.

In the case where a supply of hydraulic pressure for the clutch $C_3$ and the brake $B_2$ for setting up the reverse stage is based under the control of the third solenoid valve 420 and the reverse inhibit valve 200 as in the hydraulic pressure control circuit shown in FIG. 4, it is possible to stop the supply of hydraulic pressure to the clutch $C_1$ and one of the clutch $C_2$, the clutch $C_4$ and the brake $B_1$ by the hydraulic pressure shut up device S as shown in FIG. 1 while supplying the electric current supplied from the comparator circuit 9 to the solenoid valve S1 simultaneously to the third solenoid valve 420, so that all of the rotational power transmission through the automatic transmission is dissolved in an emergency by incorporating substantially only one unit of the hydraulic pressure shut up device C in a passage after the D port 196 of the manual valve 190.

Figures 6, 7:
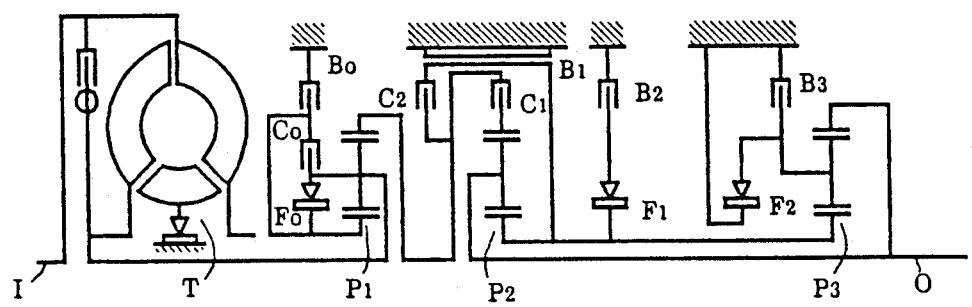
FIG. 6 is a diagrammatic illustration of another example of the planetary gear type transmission gear mechanisms of an automatic transmission for a vehicle.
FIG. 7 shows a table giving combinations of selective engagement of clutches, brakes and one way clutches for setting up various speed stages in the automatic transmission shown in FIG. 6.

FIG. 6 shows also in a schematic illustration as in FIG. 2 an example of the automatic transmissions which have been conventionally employed before the automatic transmission shown in FIG. 2. In this figure, I designates an input shaft, the rotational inputted therethrough transmitted to an output shaft O through a torque converter T and a transmission gear mechanism including three planetary gear mechanisms P1, P2 and P3. Clutches $C_0$, $C_1$ and $C_2$, brakes $B_0$, $B_1$, $B_2$ and $B_3$ and one way clutches $F_0$, $F_1$ and $F_2$ are combined with the planetary gear mechanisms P1, P2 and P3, so that in accordance with selective engagement of these clutches, brakes and one way clutches as shown in the table of FIG. 7 the first through the fourth speed stages and the reverse stage are selectively set up. In the table of FIG. 7 circles (O) shows that the corresponding clutches, brakes or one way clutches are engaged, and double circles ((O)) shows that the corresponding brakes are engaged to obtain the effect of engine braking.

In the automatic transmission of the construction shown in FIG. 6, in order to dissolve all transmission of the rotational power through the automatic transmission it is enough that at least both of the clutch $C_0$ and the brake $B_0$ are disengaged or at least one of the clutch $C_1$, the clutch $C_2$ and the brake $B_3$ is disengaged. Since the hydraulic pressure control circuit for automatic transmission shown in FIG. 6 is widely known in various embodiments, no detailed descriptions about such hydraulic pressure control circuits are omitted herein. However, it will be clear to those skilled in the art that the hydraulic pressure shut down device S as shown in FIG. 1 may be optionally incorporated in any of those hydraulic pressure control circuits in order to selectively disengage an appropriate clutch or brake.

TABLE 1

|  | $C_1$ 38 | $C_2$ 40 | $C_3$ 42 | $C_4$ 44 | $B_1$ 46 | $B_2$ 48 | $F_1$ 34 | $F_2$ 36 |
|---|---|---|---|---|---|---|---|---|
| 1st Speed Stage | O |  |  |  |  | (O) | O | O |
| 2nd Speed Stage | O |  |  | O | (O) |  |  | O |
| 3rd Speed Stage | O | O |  | O |  |  |  | O |
| 4th Speed Stage |  | O |  | O | O |  |  |  |
| Reverse Stage |  | O |  |  |  | O |  |  |

TABLE 2

|  | Speed Change Gear Ratio |
|---|---|
| 1st Speed Stage | $(1 + r_2)/r_2$ |
| 2nd Speed Stage | $\{(1 + r_2)/r_2\} - \{1/r_2(1 + r_1)\}$ |
| 3rd Speed Stage | 1 |
| 4th Speed Stage | $1/(1 + r_1)$ |
| Reverse Stage | $-1/r_1$ |

We claim:

1. A hydraulic pressure control device in an automatic transmission in a vehicle in which opening of an intake throttle valve is controlled in accordance with stepping-on amount of an accelerator pedal by way of an electronic throttle opening control means, comprising a first means for detecting a discrepancy between the stepping-on amount of the accelerator pedal and the opening of the intake throttle valve, and a second means for automatically cancelling supply of hydraulic pressure to a selected one of friction engaging means in said automatic transmission when said first means detects that said discrepancy exceeds a certain allowable limit value.

2. A hydraulic pressure control device according to claim 1, wherein said vehicle comprises a sensor for detecting actual opening of the intake throttle valve, and an electronic fuel injection control means for controlling fuel injection according to input control parameters including the opening of the intake throttle valve, said electronic fuel injection control means generating an electric signal representing the opening of the intake throttle valve based upon a signal received from said sensor, said electronic throttle opening control means generating an electric signal representing the stepping-on amount of the accelerator pedal, said first means including a comparator circuit for comparing said electric signal representing the opening of the intake throttle valve with said electric signal representing the stepping-on amount of the accelerator pedal.

3. A hydraulic pressure control device according to claim 1, wherein said second means comprises a solenoid valve means for selectively opening a drain port means, and a spool valve means having a spool, a first and a second port means adapted to be communicated with one another or isolated from one another according to a first or a second shift position of said spool, a control port means open to a first end portion of said spool for receiving a hydraulic pressure to bias said spool from said first shift position to said second shift position, and a spring means for biasing said spool from said second shift position to said first shift position, a hydraulic passage means for connecting said control port means with said first port means, and an orifice means for throttling an intermediate portion of said passage means, said drain port means being adapted to drain said passage means at a portion located between said control port means and said orifice means, said supply of hydraulic pressure to said selected one of friction engaging means being conducted through said first and second port means in said order.

4. A hydraulic pressure control device according to claim 3, wherein said automatic transmission comprises a pump means for generating a source hydraulic pressure for said supply of hydraulic pressure, said source hydraulic pressure being conducted through said first and second port means.

* * * * *